Sept. 9, 1930.  R. WÖRSCHING  1,775,180
LIGHT SCREEN FOR THE LENS OF PHOTOGRAPHIC CAMERAS
Filed Oct. 17, 1928
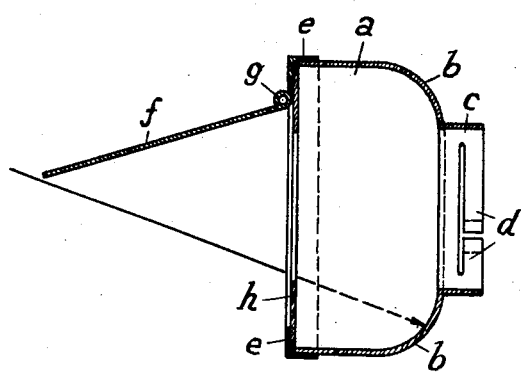
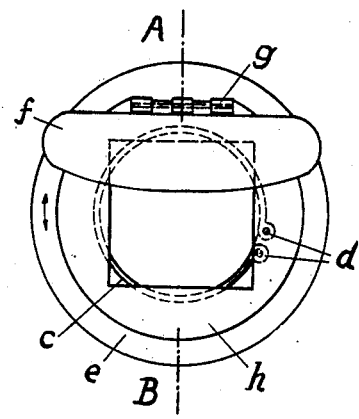
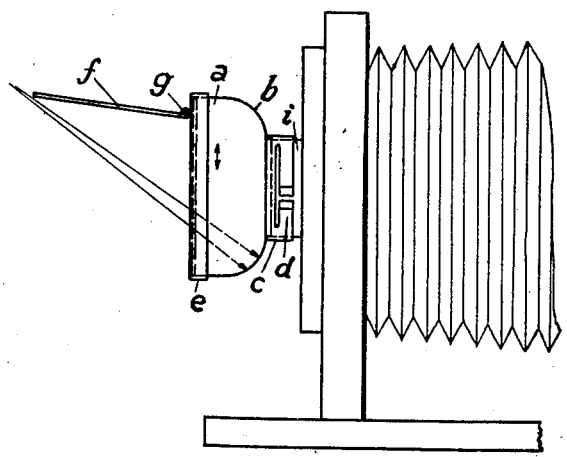
Inventor
Richard Wörsching Patented Sept. 9, 1930

1,775,180

UNITED STATES PATENT OFFICE

RICHARD WÖRSCHING, OF STARNBERG, GERMANY

LIGHT SCREEN FOR THE LENS OF PHOTOGRAPHIC CAMERAS

Application filed October 17, 1928, Serial No. 313,003, and in Germany June 16, 1927.

It is common knowledge that a photograph must not be taken opposite the sun as every direct sun ray striking on the lens is refracted several times so that it is impossible to obtain a clear picture on the opaque glass. In other words, the picture will be murky or "fogged".

To avoid this inconvenience various devices have been proposed and constructed, which are situated in front of the lens and are called sun-tubes, chamber-extensions and so forth.

The expedients fulfill their purpose only very imperfectly as they do not prevent a considerable portion of the lightrays to be intercepted from reaching the lens.

This invention relates to a light hood or screen for photographic lenses which makes it possible to obtain absolutely clear pictures, even when taken at a very steep angle to the sun, and which can be mounted easily and rapidly on any camera, even on those of very small size. This sun screen is specially valuable for any photographer, as 90% of all daylight exposures are taken during sunshine periods.

The new, very simple and cheap light screen is very stable, instantaneously ready for use, and it does not impede in the least the adjusting and handling of the levers for the dark slides, shutters and the like, arranged on the lens.

The invention is substantially characterized in that the light screen comprises a hood in the form of a tube with a curved rear portion and removably mounted on the lens holder, the curved rear portion of said light screen facing the lens. To increase the effect of the light screen the tube may have at the front a hingedly mounted visor-like lid, specially adapted as a protector against the sun.

An embodiment of the invention is illustrated, by way of example, in the accompanying drawing, in which Fig. 1 is a cross section on line 1—1 of Fig. 2.

Fig. 2 shows the light screen in front elevation.

Fig. 3 shows in side elevation the light screen mounted on a lens holder.

The light screen comprises a hood consisting of a tubular body $a$ of suitable material, for instance thin sheet metal, wood, cardboard or the like, open at the front end and having a rear wall provided with a light aperture of less diameter than the body of the tube and formed with a curved portion $b$ leading from the tube body to said light aperture and serving as a reflector similar to the reflector of a head lamp.

The curved part $b$ might be shaped according to the prevailing conditions, for instance so that the tube forms a hollow semisphere or the section of a hollow sphere.

The tube $a$, $b$ has at the rear end a holding ring $c$ designed to be placed on the lens holder of the camera. This ring $c$ may be fitted with convenient holding means, for instance with a clamping spring $d$ as shown in Figs. 1 and 3 or with clamping screws or other means.

The normally open front of tube $a$, is partly closed by a cap $e$ which has a central light aperture and a hingedly mounted flap $f$ moving on the hinge $g$ with strong friction so that it is securely held in any desired position. This cap $e$ and the flap $f$ are adapted to be rotated on the tube $a$ so that the flap can be adjusted all round the lens.

Between the tube $a$, $b$ and the lid $e$ a dark slide or stop $h$ adapted to the picture to be produced and having a proper light aperture may be inserted. Instead of dark slides yellow glass panes or other commonly used glasses may be inserted.

The ring $c$ of the light screen is pushed over the projecting rim $i$ of the lens holder, and the light screen is securely held in its position by the clamping means $d$.

If an exposure against the light, for instance against the sun, sheets of ice, bright sheets of water or bright windows or the like, has to be made the flap $f$ is elevated and adjusted by being turned to the right or left so that a shadow is cast on the lens.

Care has to be taken that the lid is sufficiently elevated so that it does not cut off the picture.

If lateral rays of the strong counter light fall nevertheless into the tube of the light screen, as indicated in Figs. 1 and 3, these light rays strike against the inner side of the curved portion $b$ of the tube and are reflected back so that they cannot fall on the lens.

This screening of secondary light is perfect in every respect.

Even with lenses which are very sensitive and with quite small size cameras photographs can be taken in counter light or glaring sunlight, and such pictures will not be fogged or show light streaks.

According to the local conditions and to the light conditions exposures can be made with or without the aid of the flap $f$.

Owing to the curved rear portion of the light screen the operating levers for the lens are easily accessible, so that they can be correctly operated.

The light screen is of such small size that it can be easily transported with the camera. The light screen protects the lens in rain and snow against getting moist.

The light screen according to the invention is very useful for exposures in artificial light specially in magnesium light, as it permits bringing the source of light closer to the lens.

The hinged flap being not mounted directly on the lens but at a certain distance in front of the same so that it can cast a shadow on the lens according to requirements, makes it possible to take photographs at a steep angle against the sun or other counter light.

I claim:—

1. A light screen for the lenses of photographic cameras, comprising, in combination, a hood to be mounted on the lens holder, said hood comprising a tubular body having a rear wall provided with a central light aperture of less diameter than the body, and a curved portion extending between the body and the aperture and forming a reflector to prevent the passage of any but direct rays through said aperture, a cap rotatably mounted on the normally open front of said tubular body and having a light aperture therein, a flap adjustably mounted on said cap for regulating the effective size of the aperture therein, and a holding ring on the rear wall of said tubular body for engagement with the lens holder.

2. A light screen for the lenses of photographic cameras, comprising, in combination, a hood to be mounted on the lens holder, said hood comprising a tubular body having a rear wall provided with a central light aperture of less diameter than the body and a curved portion extending between the body and the aperture and forming a reflector to prevent the passage of any but direct rays through said aperture, a cap rotatably mounted on the normally open front of said tubular body and having a light aperture therein, a flap adjustably mounted upon the cap for regulating the effective size of its aperture, and means for mounting the hood on the lens holder.

3. A light screen for the lenses of photographic cameras, comprising, in combination, a hood to be mounted on the lens holder, said hood comprising a tubular body having a rear wall provided with a central light aperture of less diameter than the body and a curved portion extending between the body and the aperture and forming a reflector to prevent the passage of any but direct rays through said aperture, a cap rotatably mounted on the normally open front end of said tubular body and having a light aperture therein, a flap hingedly mounted on said cap to close the aperture therein and adapted to be opened to any angular position and held in such position by hinge friction, a holding ring on the rear wall of said tubular body for engagement with the lens holder, and means for securely clamping said ring on said lens holder.

In testimony whereof I affix my signature.

RICHARD WÖRSCHING.